United States Patent
Peng

(10) Patent No.: US 9,852,753 B2
(45) Date of Patent: Dec. 26, 2017

(54) WAVEGUIDE LIGHT DELIVERY WITH SUBWAVELENGTH MIRROR FOR HEAT-ASSISTED MAGNETIC RECORDING

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/363,000

(22) Filed: Nov. 29, 2016

(65) Prior Publication Data

US 2017/0249962 A1 Aug. 31, 2017

Related U.S. Application Data

(60) Provisional application No. 62/301,028, filed on Feb. 29, 2016.

(51) Int. Cl.
- *G11B 5/02* (2006.01)
- *G11B 11/00* (2006.01)
- *G11B 5/48* (2006.01)
- *G11B 5/00* (2006.01)

(52) U.S. Cl.
CPC ..... *G11B 5/4866* (2013.01); *G11B 2005/0021* (2013.01)

(58) Field of Classification Search
CPC .... G11B 2005/0021; G11B 2005/0005; G11B 5/314; G11B 5/6088; G11B 5/6005; G11B 5/59633; G11B 5/54; G11B 5/3903; G11B 5/4907; G11B 5/2452; G11B 5/332; G11B 11/10534; B82Y 10/00; B82Y 25/10543
USPC ...... 360/59, 313, 328, 75; 369/13.13, 13.33, 369/13.32
See application file for complete search history.

(56) References Cited

U.S. PATENT DOCUMENTS

| | | |
|---|---|---|
| 6,795,630 B2 | 9/2004 | Challener et al. |
| 7,068,878 B2 | 6/2006 | Crossman-Bosworth et al. |
| 8,325,569 B1 * | 12/2012 | Shi .................... G11B 5/314 369/112.27 |
| 2007/0081426 A1 | 4/2007 | Lee et al. |

* cited by examiner

*Primary Examiner* — Nabil Hindi
(74) *Attorney, Agent, or Firm* — Hollingsworth Davis, LLC

(57) ABSTRACT

A recording head has a near-field transducer proximate a media facing surface of the read/write head. A waveguide overlaps and delivers light to the near-field transducer. A subwavelength focusing mirror is at an end of the waveguide proximate the media-facing surface. The subwavelength focusing mirror recycles a residual transverse field for excitation of the near-field transducer.

20 Claims, 11 Drawing Sheets

WAVEGUIDE LIGHT DELIVERY WITH SUBWAVELENGTH MIRROR FOR HEAT-ASSISTED MAGNETIC RECORDING

RELATED PATENT DOCUMENTS

This application claims the benefit of Provisional Patent Application Ser. No. 62/301,028 filed on Feb. 29, 2016, to which priority is claimed pursuant to 35 U.S.C. §119(e), and which is incorporated herein by reference in its entirety.

SUMMARY

The present disclosure is directed to waveguide light delivery with subwavelength mirror for heat-assisted magnetic recording. In one embodiment, a recording head has a near-field transducer proximate a media facing surface of the read/write head. A waveguide overlaps and delivers light to the near-field transducer. A subwavelength focusing mirror is at an end of the waveguide proximate the media-facing surface. The subwavelength focusing mirror recycles a residual transverse field for excitation of the near-field transducer.

In another embodiment, a recording head has a near-field transducer proximate a media facing surface of the read/write head. A waveguide overlaps and delivers light to the near-field transducer. A subwavelength focusing mirror is at an end of the waveguide proximate the media-facing surface. The subwavelength overlaps less than a length of the near-field transducer in a direction normal to the media-facing surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer concentrates optical energy into a tiny optical spot in a recording layer, which raises the media temperature locally, reducing the writing magnetic field required for high-density recording. A waveguide delivers light to the near-field transducer and excites the near-field transducer.

The following disclosure relates to components that improve near-field transducer performance (efficiency, thermal gradient, etc.). One of these components is a subwavelength-sized lensed waveguide end that recycles optical energy residing in the waveguide near the distal end of the near-field transducer. For an optical system integrated with near-field transducer excited with a first higher-order transverse electric mode ($TE_{10}$), the focusing mirror converts the residual transverse electric field component to a longitudinal one to boost the near-field performance. A 90% improvement in the near-field transducer efficiency can be obtained.

Figure 1:
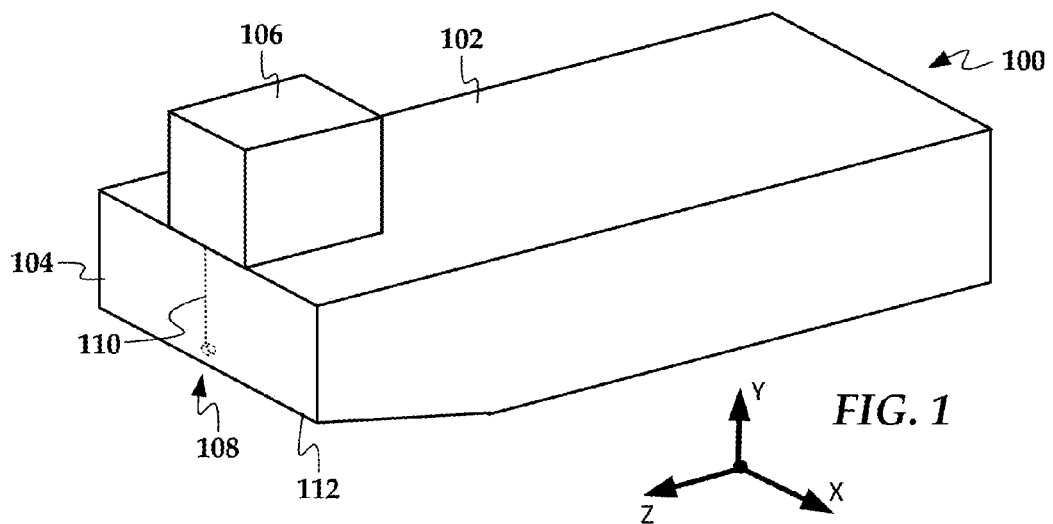
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot on the recording medium.

Heat assisted magnetic recording uses a NFT to concentrate optical energy into a tiny optical spot in a recording layer, which raises the media temperature locally, reducing the writing magnetic field required for high-density recording. The waveguide 110 delivers light to the near-field transducer and excites the near-field transducer. Near-field transducers described herein may use an optical antenna with a protruded tip (e.g., peg). However, the embodiments described herein may be applicable to other types of near-field transducers, such as an elongated pin, subwavelength metallic aperture, metallic plates with a gap therebetween, etc.

An optical antenna works by taking advantage of excitation of local surface-plasmon (LSP) at the interface between a plasmonic metal of free electrons and a dielectric material. The size of an optical antenna is designed to reach LSP at a desired light wavelength. On resonance, optical energy from the waveguide can be concentrated into a local volume, field-line concentration occurs at a local shape singularity, such as a gap or a tip, due to the collective oscillations of electrons in the metal, which increases the interaction between light and matter.

The coupling between the propagating waves in the waveguide and the optical antenna is usually not complete, due to impedance mismatch between the propagating waveguide waves and the localized, enhanced fields. Therefore some fields still reside in the waveguide at the distal end of the near-field transducer in a close proximity to a recording medium. Part of these fields will be absorbed in the recording medium, causing background heating and degrading the recording performance. One way to mitigate the background heating is to use a metallic blocker or optical shield near the media-facing surface. Embodiments described below re-use those residing fields to improve the near-field transducer performance. For example, a subwavelength-sized mirrored waveguide end is formed near the distal end of the near-field transducer. This lensed channel waveguide improves near-field transducer recording performance.

Figure 2:
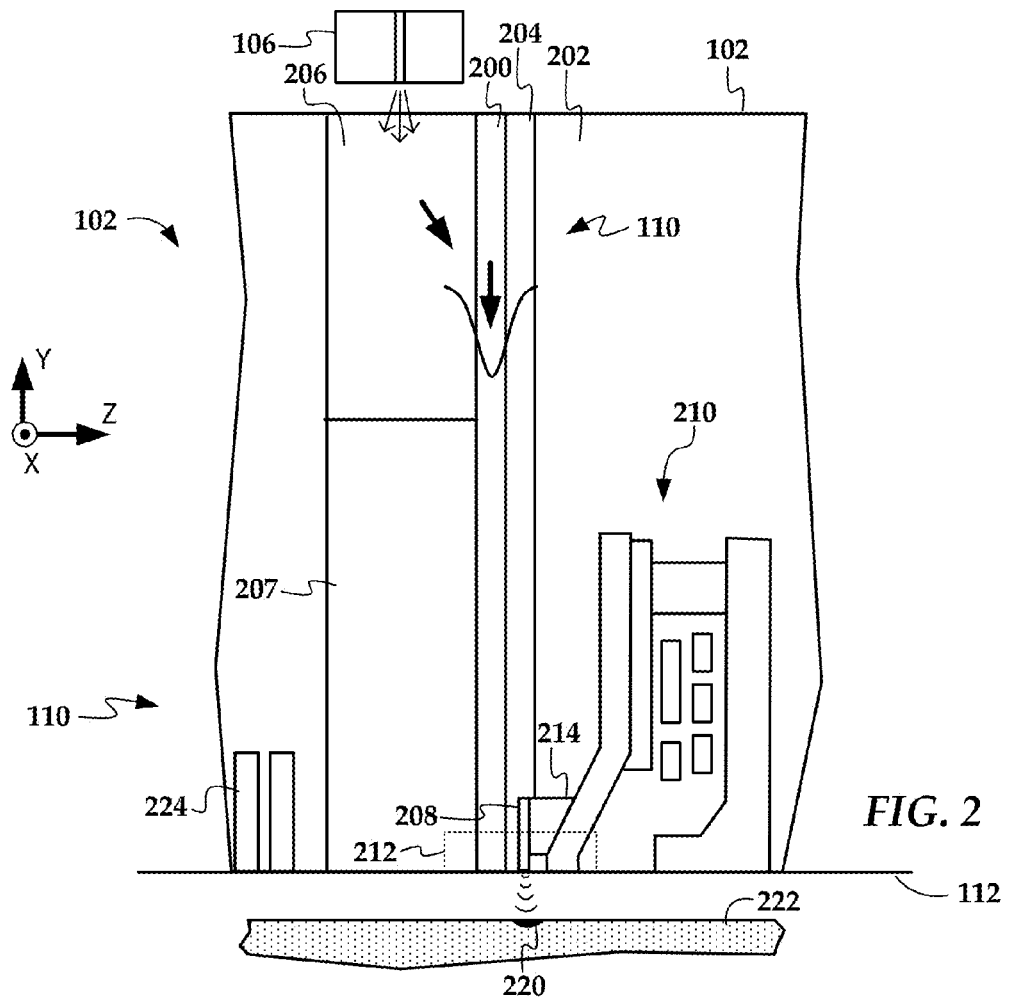
FIG. 2 is a cross-sectional view of a slider along a down-track plane according to according to an example embodiment.
Figure 3:
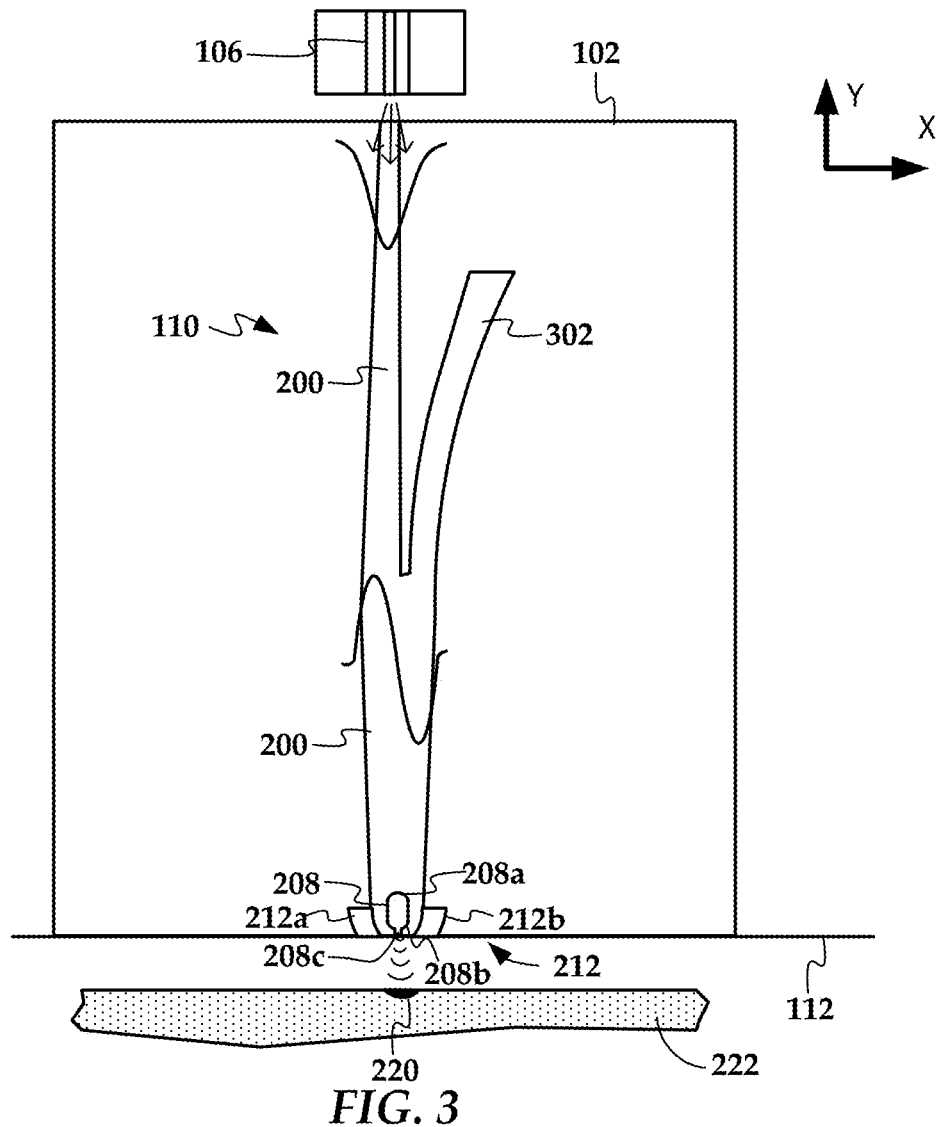
FIG. 3 is a wafer plane view of a slider according to an example embodiment.
Figure 4:
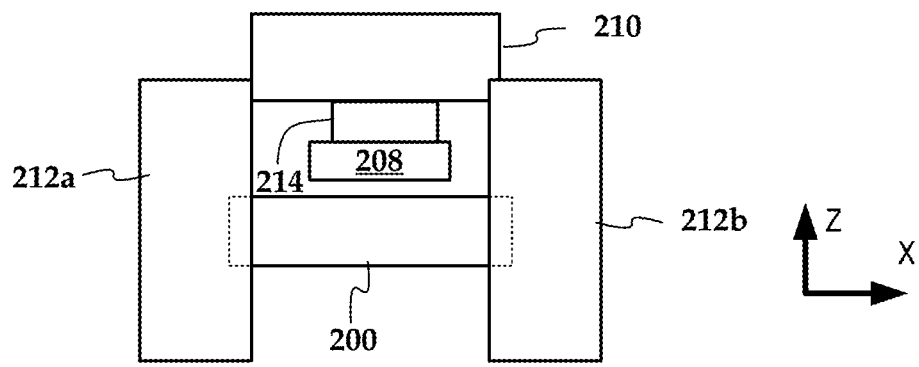
FIG. 4 is a media-facing surface view of a slider according to an example embodiment.

In FIGS. 2-4, respective cross-sectional, wafer plane, and ABS views of the slider body 102 show a light delivery system according to an example embodiment. The slider body includes an NFT 208, a magnetic writer 210 and a micro-sized focusing mirror 212. Light, emitting from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. A fundamental transverse electric mode, $TE_{00}$, is excited and propagates along the waveguide 110. The excited $TE_{00}$ mode, is then converted into a first higher-order mode, $TE_{10}$, of a two or a few modes waveguide with an assistant branch waveguide 302, as described, for example, in commonly-owned U.S. Pat. No. 9,322,997, dated Apr. 26, 2016.

The NFT 208 has two curved, two flatted, or one curved and the other one flatted ends 208a-b and a protruded peg 208c. The NFT 208 is placed proximate a side cladding layer 204 and top cladding layer 202 of the waveguide 110 and near the waveguide core 200. The NFT 208 could be also placed into the waveguide core 200. For additional details, see commonly-owned U.S. Pat. No. 9,251,819, dated Feb. 2, 2016. The NFT 208 achieves plasmonic resonance in response to the light coupled via the waveguide 110, and creates a small hotspot 220 on a recording medium 222 during recording.

A magnetic reader 224 is shown down-track from the NFT 208 and writer 210. The magnetic reader 224 may include a magneto-resistive stack that changes resistance in response to changes in magnetic field detected from the recording medium 222. These changes in magnetic field are converted to data by a read channel of the apparatus (e.g., hard disk drive assembly).

The waveguide core 200 is made of dielectric materials of high index of refraction, for instance, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The cladding layers 202, 204, 207 are each formed of a dielectric material having a refractive index lower than the core, be made of a material, for instance, $Al_2O_3$ (aluminum oxide), SiO and $SiO_2$ (silica). The material for the near-field transducer 208 has negative permittivity, such as Au, Ag, Cu, Al, Rh, Ir, Pt, etc.

Figure 5:
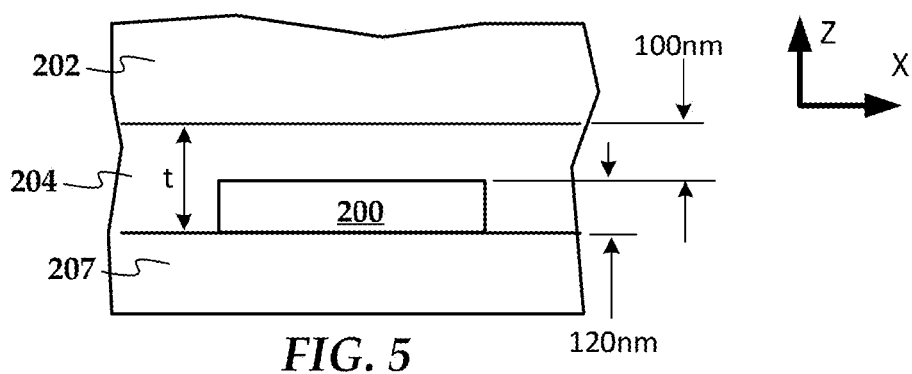
FIG. 5 is a cross-sectional view of waveguide according to an example embodiment.
Figure 6:
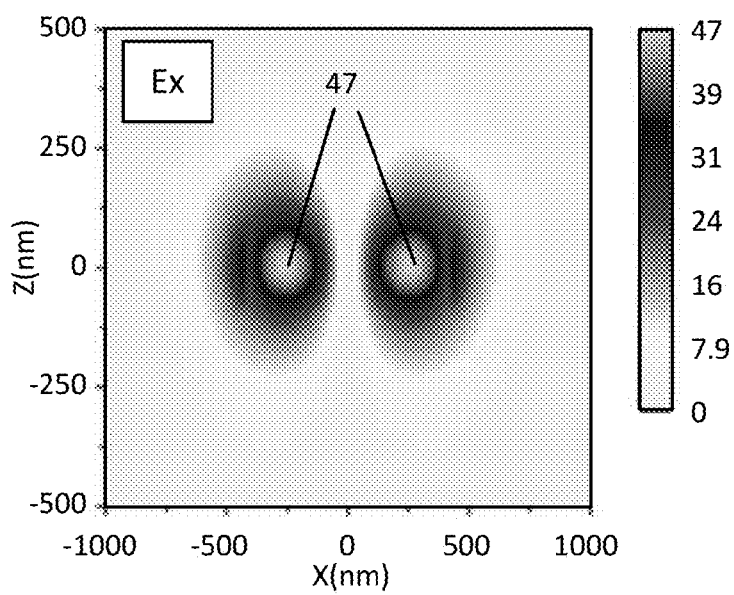
FIGS. 6 and 7 are graphs of electric field amplitude profiles for coupling a waveguide with a near-field transducer coupling according to an example embodiment.
Figure 7:
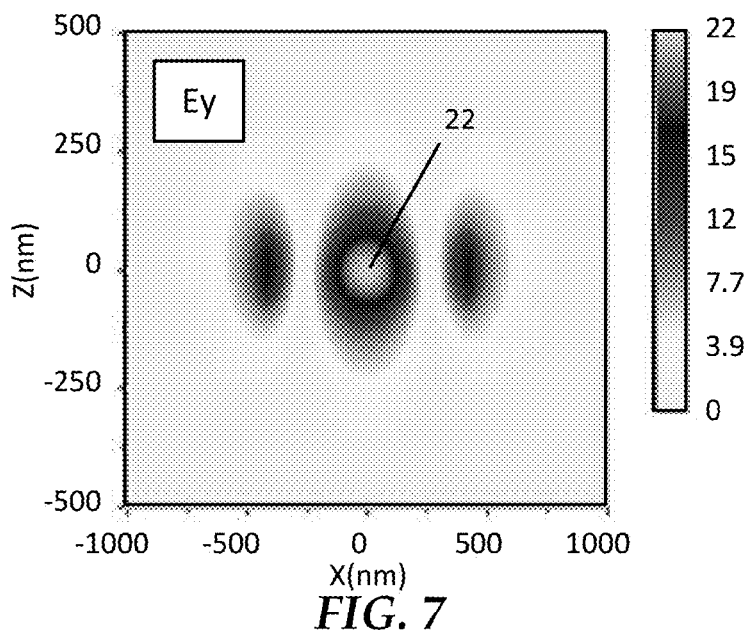

As an example, consider a waveguide with a 120 nm thick (along the z-direction) niobium oxide ($Nb_2O_5$) core of refractive index n=2.29, surrounded with silica ($SiO_2$, n=1.46) bottom and top cladding layer and with alumina ($Al_2O_3$, n=1.63) side cladding, as shown in the cross-sectional view of FIG. 5. The side cladding 204 is t=220 nm thick. The optimized core width for NFT efficiency (without the presence of a focusing mirror) is 850 nm along the x-direction. Light wavelength λ=830 nm. The graphs in FIGS. 6 and 7 show the amplitude profiles of the two dominant electric field components and the physical mechanism for the NFT-$TE_{10}$ mode coupling. The $TE_{10}$ mode has two lobes in the transverse electric field $E_x$ and three lobes in the longitudinal electric field component $E_y$.

Figure 8:
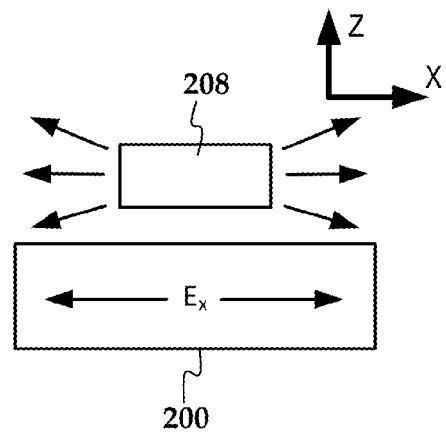
FIGS. 8 and 9 are diagrams showing transverse and longitudinal field excitation in a waveguide core according to an example embodiment.
Figure 9:
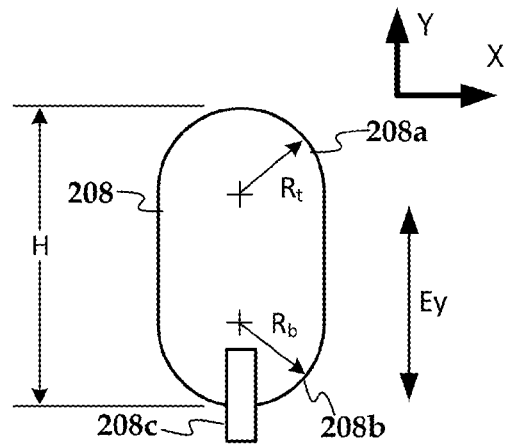

In FIG. 8, a diagram shows the transverse field ($E_x$) excitation in the core 200 and NFT 208. In FIG. 9, a diagram shows longitudinal ($E_y$) excitation in the NFT 208, along with NFT dimensions. In $E_x$, the two lobes have a π phase difference; in $E_y$, the central lobe is dominant in intensity while the two side lobes are centered at the interface between the waveguide core and side cladding. The transverse electric field $E_x$ excites a local surface plasmon along the circumference of the main body of the near-field transducer, funneling to the peg 208c. The NET dimension and shape, e.g., the end curvatures $R_b$ and $R_t$, height H, are optimized to have far-field radiation patterns that match the waveguide mode as closely as possible for efficiency. The longitudinal electric field component $E_y$ drives the electric charges to the protruded peg 208c, resulting in rod-lightning effect. The NFT main body and the peg form a resonator to generate a confined hot spot in a recording medium.

Modeling shows that efficient excitation of the NFT prefers to have the peak magnitude of the longitudinal component $E_y$ be more or less equal to that of the transverse component $$E_x, \left|\frac{E_y}{E_x}\right| \geq 1.$$

This requirement is usually not fulfilled with a channel waveguide, for instance, in FIGS. 6 and 7, $$\left|\frac{E_y}{E_x}\right| = \frac{22}{47} = 0.47.$$

A waveguide having high contrast in the index of refraction between the core and cladding yields greater $E_y$. In U.S. Pat. No. 9,424,867, dated Aug. 23, 2016, an interferometric method was proposed to increase this ratio by converting portion of the $TE_{10}$ mode into the fundamental transverse magnetic $TM_{00}$ mode in the waveguide. The longitudinal component $E_y$ is enhanced at the peg location when the phase difference between $TE_{10}$ and $TM_{00}$ mode at the peg location is appropriate, yielding a 40-50% improvement in NFT efficiency. However, the $TM_{00}$ mode does not efficiently interact with the near-field transducer (which is designed for $TE_{10}$ mode), leading to a loss of energy as well as thermal gradient.

Note that the NFT-$TE_{10}$ mode coupling is not complete. There is still a significant amount of field remaining in the waveguide. Embodiments below use these residual fields and convert them into a longitudinal component near the peg position to boost the NFT performance. This involves using a subwavelength-sized focusing mirror 212, for instance, a parabolic mirror, an elliptic mirror, and an aspherical mirror, etched into the waveguide from the top cladding, core, all the way to the bottom cladding at the waveguide end to transform those residual transverse fields into a longitudinal field. The etched regions are metallized to provide reflective surfaces, resulting in what is sometimes referred to as a solid-immersion mirror. This focusing mirror 212 should be small, which minimizes the disturbance of the NFT-$TE_{10}$ mode coupling. As seen in FIGS. 3 and 4, the mirror 212 includes reflective portions 212a-b on either side of and facing the NFT 208. Note that for the 830 nm light wavelength used in this modeling, the subwavelength mirror 212 will be submicron-sized. A conventional lens or mirror for focusing is usually much larger than one wavelength.

Figure 10:
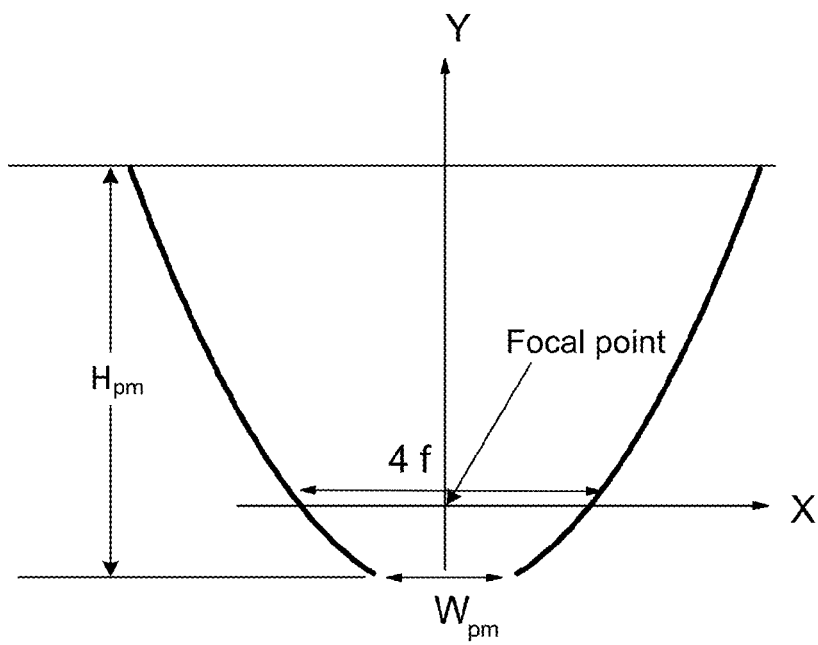
FIG. 10 is a diagram showing the shape of a parabolic mirror according to an example embodiment.

To demonstrate this idea, a parabolic mirror as a focusing lens is considered, as shown in the diagram of FIG. 10. The shape of a parabolic mirror is determined by its paraxial focal length, f. It has a bottom opening, $W_{pm}$, at the distal end of the NFT peg, and a height $H_{pm}$ away from the media-facing surface. The focusing mirror is usually shorter than and away from the NFT to minimize its impact to the waveguide mode-NFT coupling. The dimension of the mirror, including f, $W_{pm}$, and $H_{pm}$, can be determined to optimize certain figures of merit, such as the NFT efficiency and the thermal gradient. Here the NET efficiency is used as the figure of merit, defined as the light absorption in the recording layer in a 50 nm by 50 nm square area through the recording layer.

Without a focusing mirror, the optimized NFT has the following dimensions: end radius of curvature $R_b=R_t=200$ nm, height H=600 nm. The peg dimension is 40-nm wide along x-direction (cross-track), 30-nm thick along the z-direction (down-track), and the end of the peg 208c is 20-nm away from the media-facing surface (along the y-direction). Along the z-direction, the NFT 208 is placed 20-nm away from the core 200. The magnetic pole is slanted at 26° from the y-direction and connected with the NFT by a heat-sink 214. Both NFT 208 and NFT heat-sink 214 use gold, n=0.188+j 5.39. The pole is 200-nm wide along x direction and wrapped with a Cr-heat sink. The total width (along the x-direction) of the pole plus Cr heat-sink is 600-nm. The heat-sink/pole is truncated at the far-end of the NFT 208. The NFT-pole spacing (NPS) at the media-facing surface is 20 nm.

This example assumes a recording medium is formed of a FePt layer (12.6 nm thick, complex refractive index n=2.55+j 2.72), a MgO layer (10 nm thick, n=1.70), and a heat-sink Cu layer (60 nm, n=0.26+j 5.29) on a glass substrate. The head-medium spacing is 8 nm, effective index n=1.21. For thermal modeling, the light absorption inside the medium is treated as the heat source for the temperature rise. It is assumed that the specific heat C=4.19 J/cm$^3$/K, in-plane thermal conductivity K=0.05 J/cm/s/K, out-of-plane K=5 for the FePt layer; C=3.14 and K=0.052 for the MgO layer; C=3.49 and K=2 for the Cu heat-sink layer; C=1.64 and K=0.01 for the glass substrate.

Figure 11:
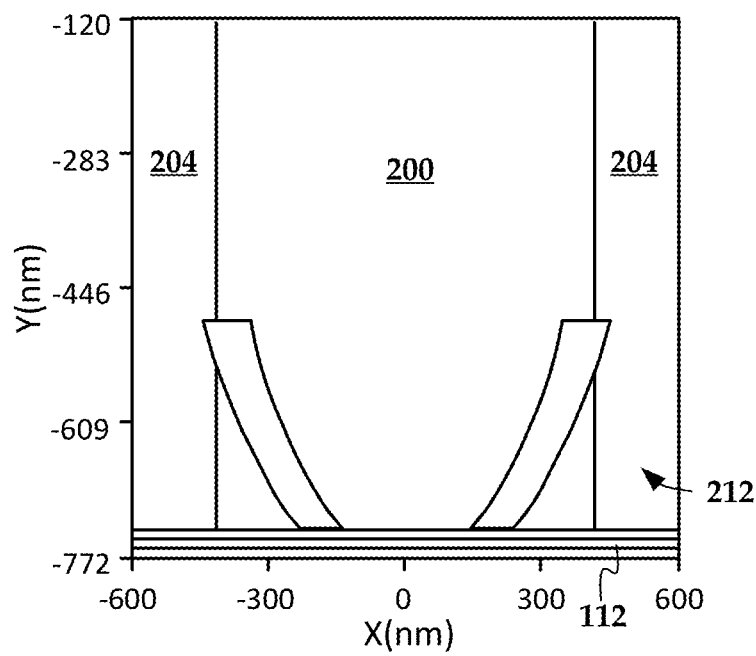
FIGS. 11 and 12 are diagrams showing details of a mirror, near-field transducer, and waveguide according to example embodiments.
Figure 12:
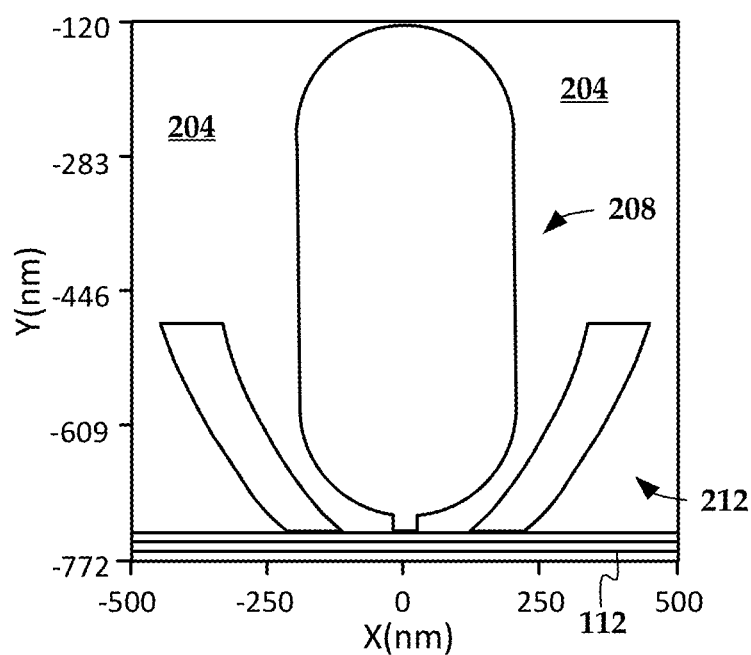
Figure 13:
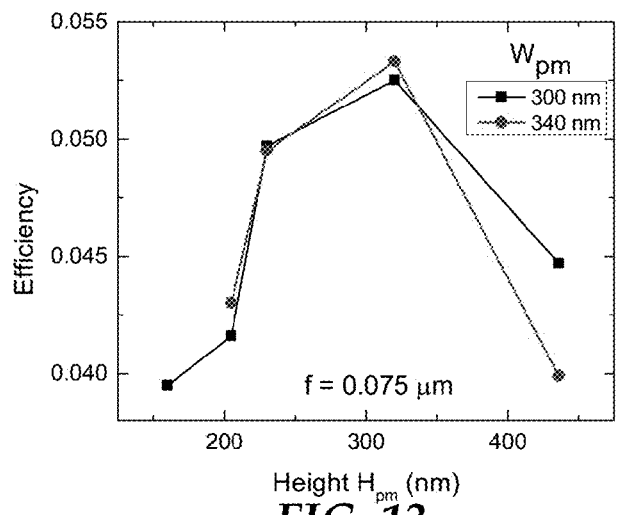
FIGS. 13, 14, and 15 are a graphs showing near-field transducer efficiency versus parabolic mirror height for different bottom openings and focal length according to example embodiments.
Figure 14:
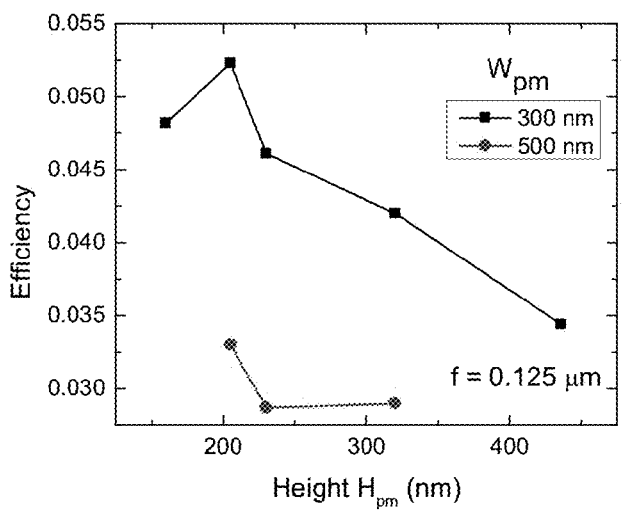
Figure 15:
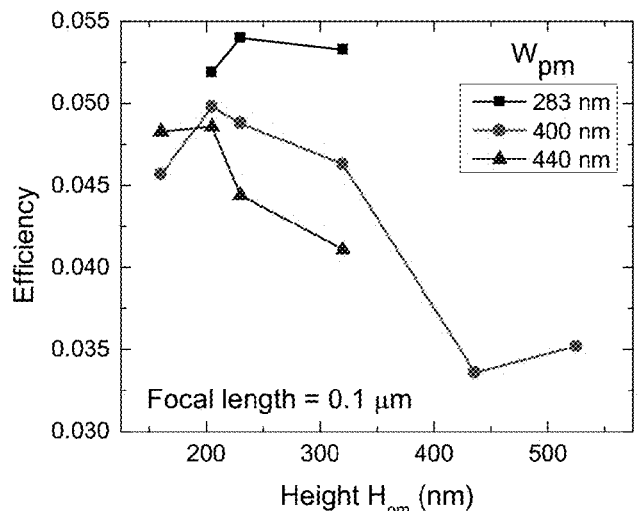
Figure 16:
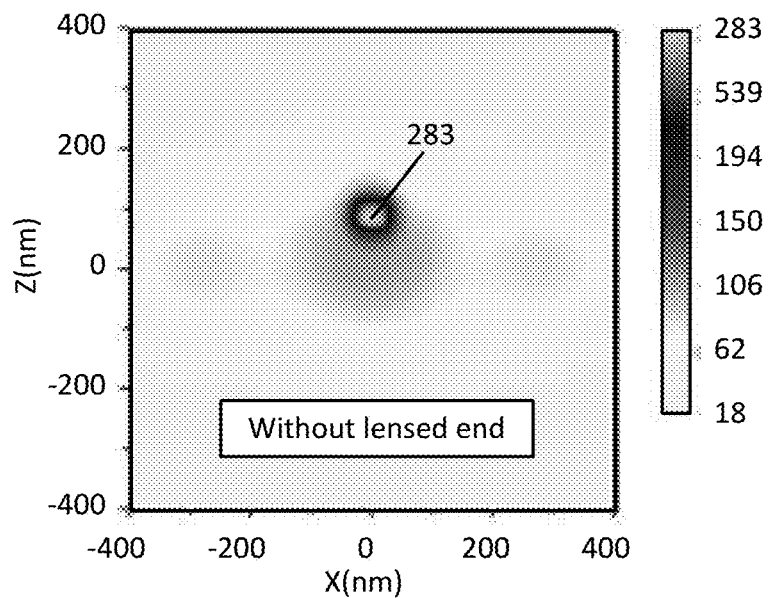
FIGS. 16 and 17 are temperature profile graphs of a hotspot in a recording medium according to an example embodiment.
Figure 17:
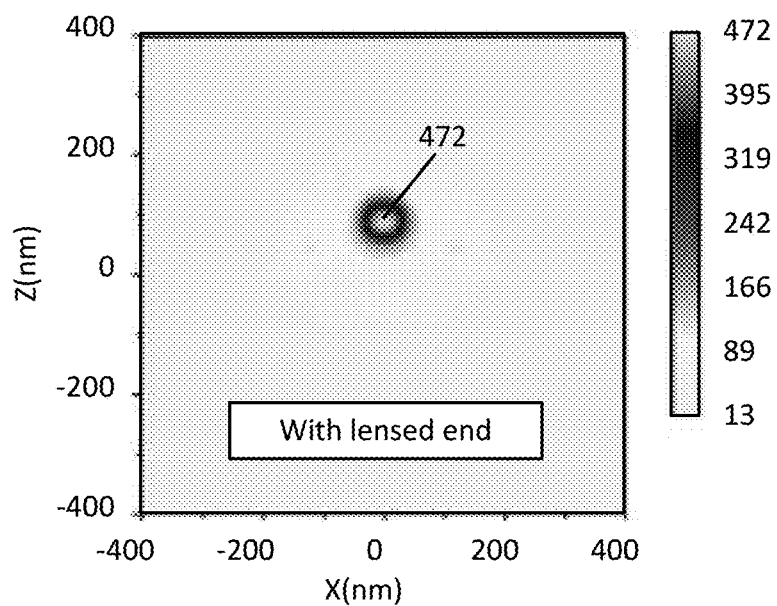
Figure 18:
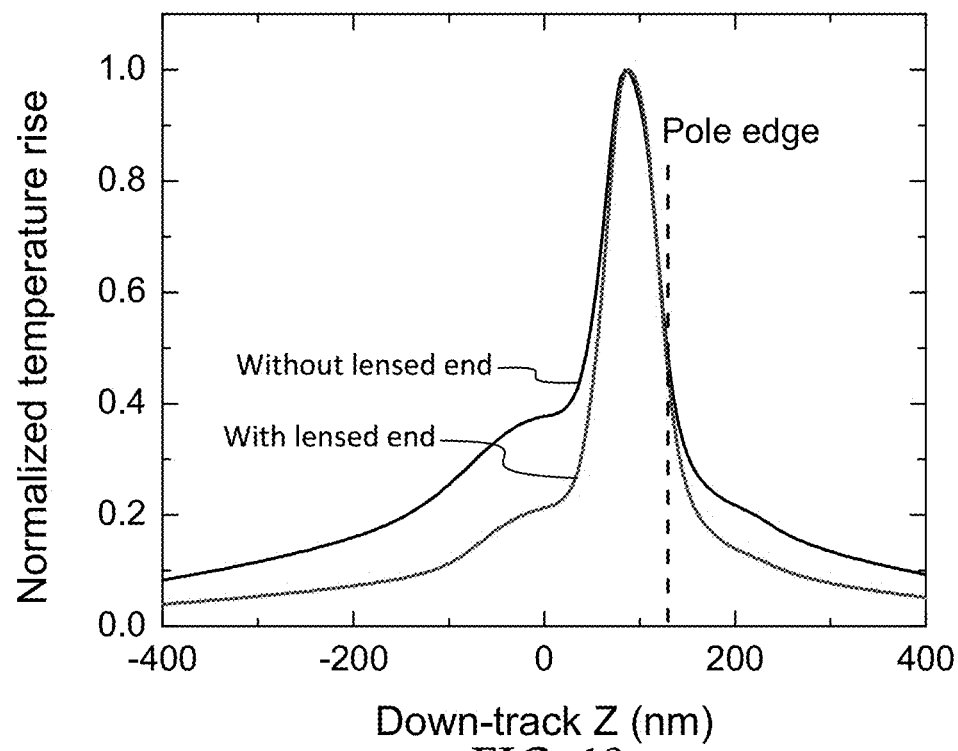
FIGS. 18 and 19 are graphs of down-track and cross-track hotspot temperatures in a recording medium according to an example embodiment.
Figure 19:
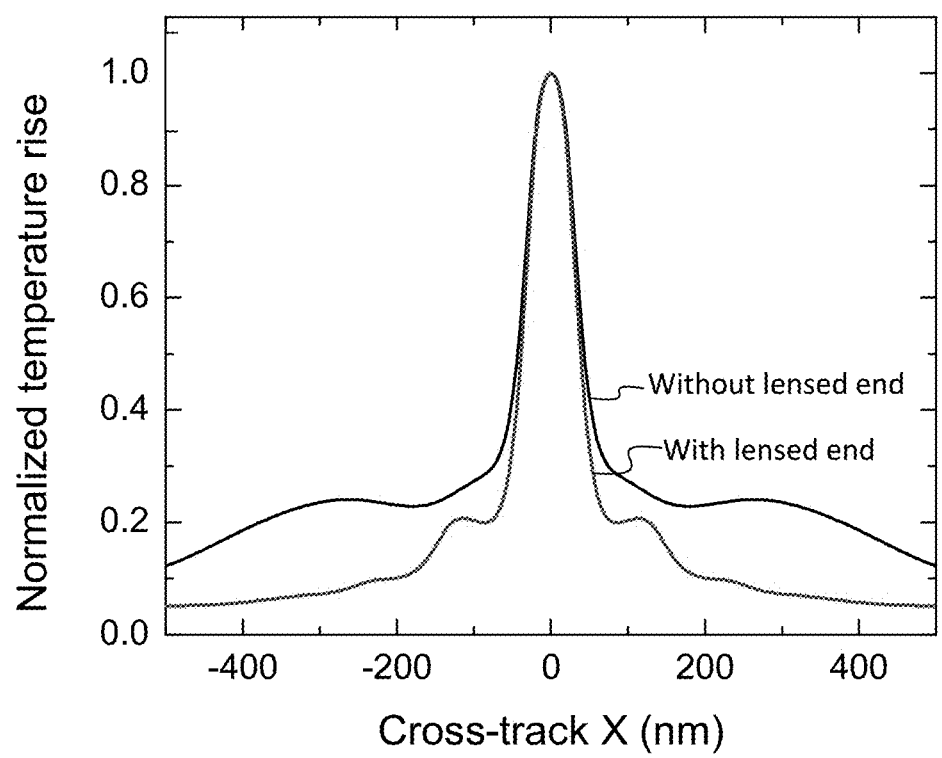
Figure 20:
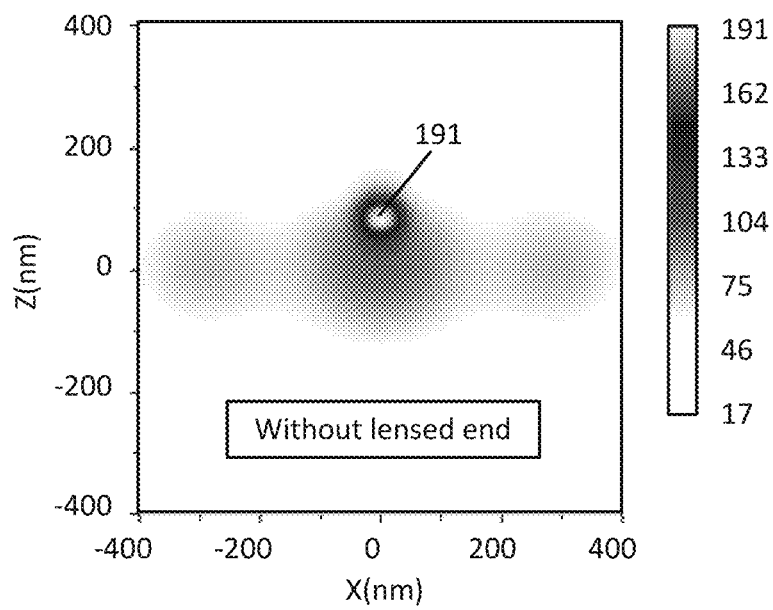
FIGS. 20 and 21 are temperature profile graphs of a hotspot in a recording medium according to an example embodiment using an Rh peg.
Figure 21:
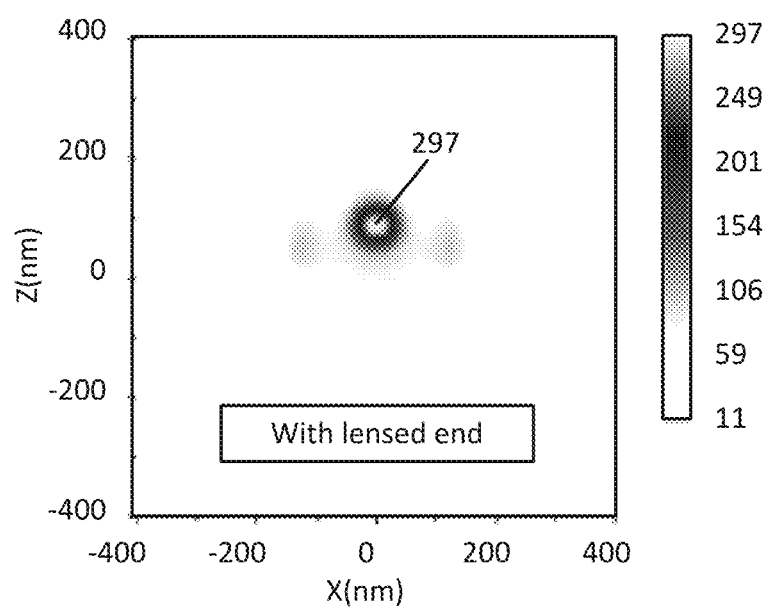
Figure 22:
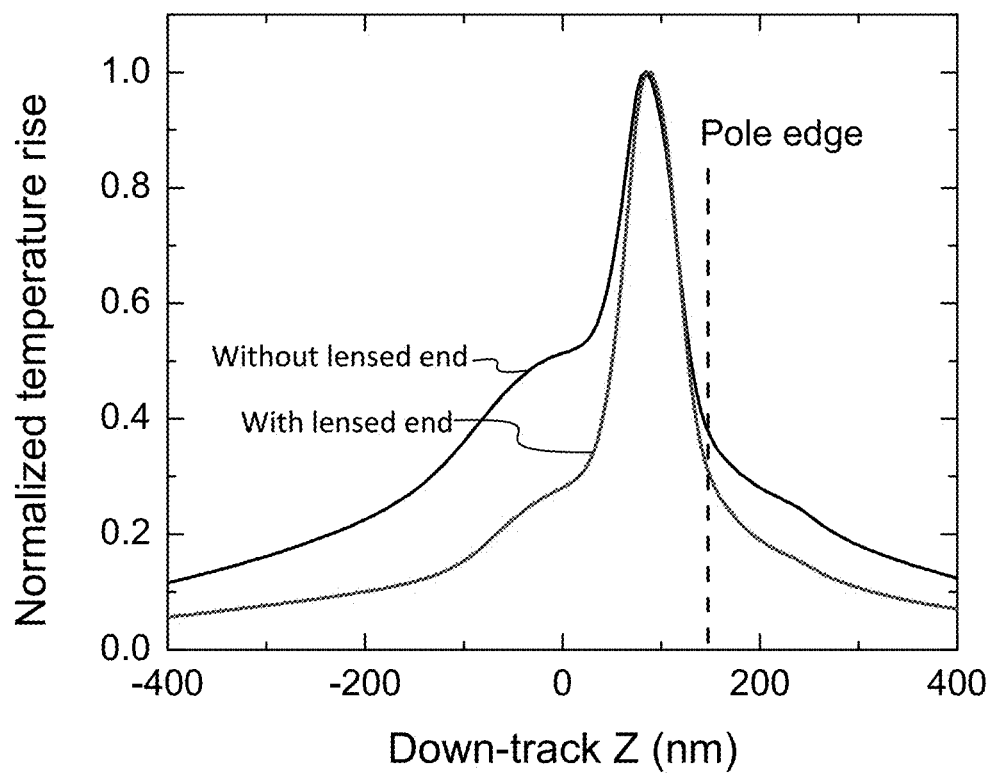
FIGS. 22 and 23 are graphs of down-track and cross-track hotspot temperatures in a recording medium according to an example embodiment using an Rh peg.
Figure 23:
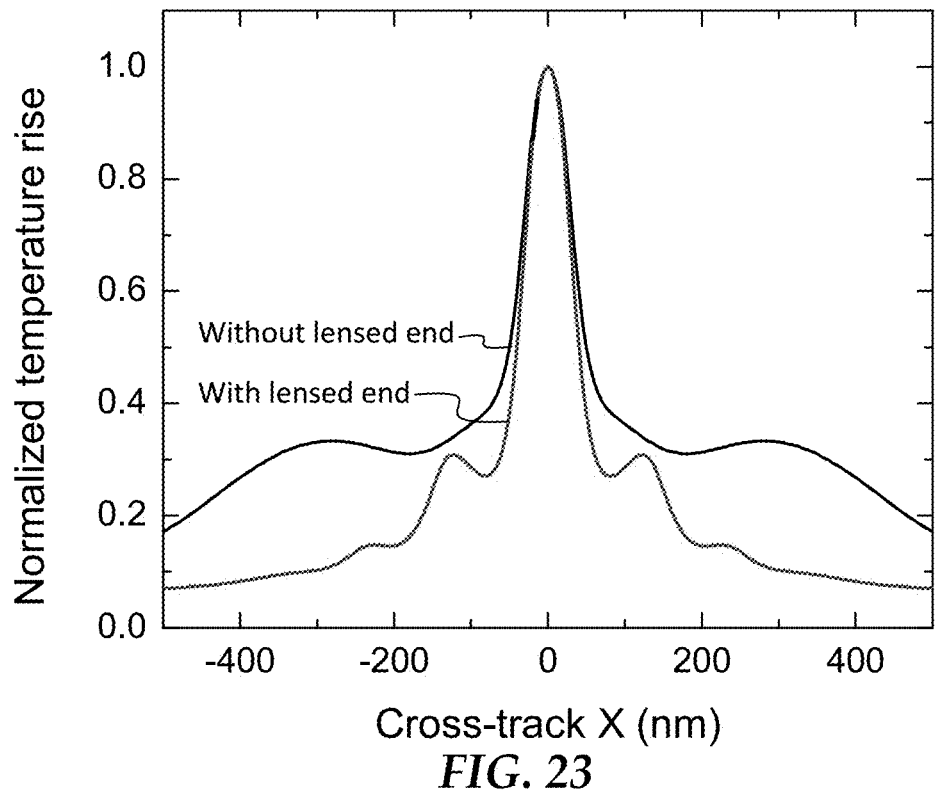

In FIGS. 11 and 12, diagrams show additional dimensional details of the mirror, waveguide, and NFT proximate the media-facing surface. The views in FIGS. 11 and 12 are on planes parallel to the wafer substrate surface. In FIG. 11, the view is of the focusing mirror at the core plane. In FIG. 12, the view is of the focusing mirror at the plane with the NFT. Note that the reflecting surfaces of the mirror 212 are usually shorter than a length of the NFT (e.g., less than or slightly more than half the NFT length) along the y-direction. Along the x-direction, the reflecting surfaces are thicker than the skin-depth of the material used for mirror. The mirror's shape is determined by its paraxial focal length, f. The mirror 212 is centered at the near-field transducer 208. At the geometrical focal plane, the mirror has a width of 4 f along the x-direction. The mirror's dimension is determined by its bottom opening, $W_{pm}$, at the distal end of the peg or at the media-facing surface 112, and height $H_{pm}$. One example has f=0.1 μm, bottom opening $W_{pm}$=0.28 μm, height $H_{pm}$=0.238 μm In FIGS. 13-15, graphs show the NFT efficiency versus the parabolic mirror height ($H_{pm}$) at a few bottom openings ($W_{pm}$) and at three focal lengths f=0.075, 0.1 and 0.125 μm. For this modeling, the waveguide and NFT dimension are the same as those without a focusing mirror. Without a focusing mirror, the NFT efficiency=0.0286. It is evident that the NFT efficiency=0.054 can be obtained at certain combination of f, $W_{pm}$ and $H_{pm}$, which is an improvement of 90%. The optimal mirror height $H_{pm}$ is 200-400 nm, much shorter than the height of NFT, ~600 nm.

In FIGS. 16-19, graphs show the temperature rise at the middle plane of the FePt recording layer after the illumination of 10 mW in power and 10 ns in time. For the comparison, results without a focusing mirror but otherwise similar components are also displayed. The peak temperature rise increases from 283 K to 472 K with the subwavelength-sized parabolic mirror, an increase of 67%. The normalized temperature rise presents significant thermal background reduction, leading to a 15% improvement in thermal gradient. The thermal background results mainly from the incomplete NFT-$TE_{10}$ mode coupling as well as the NFT induced polarization conversion from the $TE_{10}$ to $TM_{00}$ mode.

The modeling is also performed by replacing the Au peg with a Rh (rhodium) peg. Rh has much higher melting temperature than Au, yielding much better reliability. The complex refractive index of Rh is n=2.80+j 7.15 and the corresponding relative permittivity is $\epsilon_r$=−43.3+j 40.0. Comparing to that of gold ($\epsilon_r$=−29.0+j 2.02), greater real part in $\epsilon_r$ means that a longer Rh peg is preferred for better thermal gradient. Greater imaginary part means more absorption in the Rh peg. A surface-plasmon wave propagating at a Rh/$Al_2O_3$ interface has a loss of 4.4 times as high as that at a Au/$Al_2O_3$ interface.

For this modeling, the Rh peg is still 40 nm wide along the x-direction and 30 nm thick along the z-direction. In this case, the peg is 72 nm long, with 32 nm protruded out of the NFT main body, which is made of Au material. The NPS (NFT-pole spacing at the media-facing surface) is increased to 35 nm. The NFT efficiency improvement is 80%. The graphs in FIGS. 20-23 show results of thermal modeling with the Rh peg. Without a focusing mirror, the peak temperature rise is reduced by as much as 50% with Rh peg and the thermal background becomes much more pronounced. With the parabolic mirror, the peak temperature is increased from 191K to 297K, an improvement of 55%. In the meantime, the thermal background is substantially reduced, the thermal spot size in FWHM (full-width-at-halfmaximum) is reduced from 99 nm to 81 nm along X (e.g., cross-track) direction, and from 148 nm to 77 nm along Z (e.g., down-track) direction. The thermal gradient is improved by 34%.

This idea can be also applied to other approaches with NFT-mode coupling, for instance, a tapered peg-only design with a $TM_{00}$ mode and an angled stadium designs that utilize a $TE_{00}$ mode, see U.S. patent application Ser. No. 14/928,611 (filed Oct. 30, 2015). The tapered peg-only design uses a $Ta_2O_5$ waveguide core of 600 nm wide by 400 nm thick. The $TM_{00}$ mode has a mode size of 400 nm in FWHM along cross-track direction.

A parabolic mirror could focus light down to 200 nm in the central spot, much smaller than the mode size. However, if using a parabolic mirror focusing field to excite the NFT, at least two issues arise. The first issue is the low NFT efficiency due to the large impedance mismatch between the focusing field and the NFT radiation. The second issue is the sidelobes on either side of the central spot from the mirror focusing. The present embodiments use a subwavelength sized focusing mirror, which minimizes the disturbance to the NFT-$TM_{00}$ mode coupling and uses those residual fields in the waveguide that are not coupled into the NFT to enhance the NFT efficiency. The sidelobes are minimized and also blocked by the focusing mirror itself.

In summary, a subwavelength-sized mirrored channel waveguide improves the near-field transducer performance significantly. In terms of efficiency, it is as much as 90%. It also reduces the thermal background, in particular, for the NFT with Rh peg. For an optical system with a $TE_{10}$ mode, a subwavelength sized focusing mirror at the end of channel waveguide uses those residual fields in the waveguide that are not coupled into the NFT and converts the transverse electric field component into the longitudinal component to boost the rod-lightning effect. The idea is applicable to other systems, for instance, tapered peg-only design with a $TM_{00}$ mode, and an angled stadium+peg NFT design with a $TE_{00}$ mode, etc.

In other embodiments, an optical side shield has been used with a tapered peg-only design to mitigate thermal background to improve thermal gradient. When applying the optical shield to stadium+peg NFT designs, the thermal gradient does improve 10-20%, but reduces the near-field transducer efficiency by 15-20%. In such a case, using a mirrored waveguide end can boost the NFT efficiency by 90%, reducing the thermal background substantially for NFT with Rh peg, and also improving thermal gradient significantly.

Figure 24:
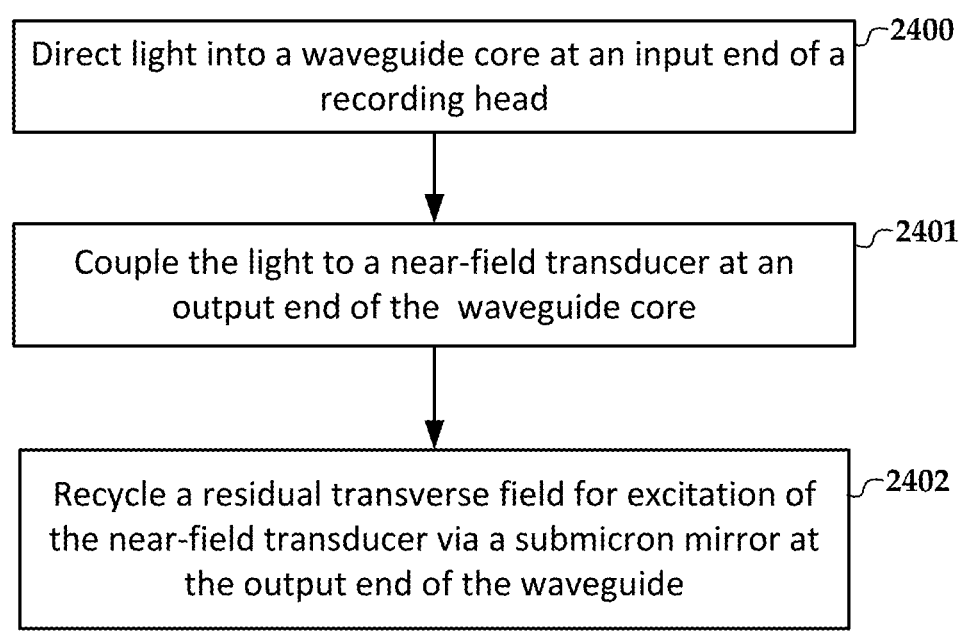
FIG. 24 is a flowchart of a method according to an example embodiment.

In FIG. 24, a flowchart shows a method according to an example embodiment. The method involves directing 2400 light into a waveguide core at an input end, e.g., near a top of a slider. The light is coupled 2401 to a near-field transducer at an output end of the waveguide core near a media-facing surface of the recording head. A residual transverse field is recycled 2402 for excitation of the near-field transducer via a subwavelength mirror at the output end of the waveguide. The sub-micron mirror overlaps less than a length of the near-field transducer in a direction normal to the media-facing surface.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a near-field transducer proximate a media facing surface of the read/write head;
   a waveguide that overlaps and delivers light to the near-field transducer; and
   a subwavelength focusing mirror at an end of the waveguide proximate the media-facing surface, the subwavelength focusing mirror recycling a residual transverse field for excitation of the near-field transducer.

2. The recording head of claim 1, wherein the recycling of the residual transverse fields comprises transforming the residual transverse field into a longitudinal field.

3. The recording head of claim 1, wherein the near-field transducer extends a first distance away from the media-surface and the focusing mirror extends a second distance away from the media-surface, the second distance being less than the first distance.

4. The recording head of claim 1, wherein the subwavelength focusing mirror comprises a maximum first cross-track width that is no more than four times a second cross-track width of the near-field transducer.

5. The recording head of claim 1, wherein the subwavelength focusing mirror comprises a metallized, solid-immersion mirror.

6. The recording head of claim 1, wherein the subwavelength focusing mirror comprises a parabolic mirror.

7. The recording head of claim 1, wherein the subwavelength focusing mirror comprises one of an elliptic mirror, and an aspherical mirror.

8. The recording head of claim 1, wherein the subwavelength focusing mirror is etched through a top cladding, bottom cladding, and core of the waveguide.

9. The recording head of claim 1, wherein the near-field transducer comprises an enlarged portion and a peg, the peg being made of a different material than the enlarged portion.

10. The recording head of claim 1, wherein the light is coupled into the near-field transducer in a first-higher order transverse electric mode.

11. A recording head comprising:
    a near-field transducer proximate a media facing surface of the read/write head;
    a waveguide that overlaps and delivers light to the near-field transducer; and
    a subwavelength focusing mirror at an end of the waveguide proximate the media-facing surface, the subwavelength focusing mirror overlapping less than a length of the near-field transducer in a direction normal to the media-facing surface.

12. The recording head of claim 11, wherein the subwavelength focusing mirror recycles residual transverse fields to boost performance of the near-field transducer.

13. The recording head of claim 12, wherein the light is coupled into the near-field transducer in a first-higher order transverse electric and wherein the recycling of the residual transverse fields comprises transforming the residual transverse fields into longitudinal fields.

14. The recording head of claim 11, wherein the subwavelength focusing mirror comprises a metallized, solid-immersion mirror.

15. The recording head of claim 11, wherein the subwavelength focusing mirror comprises one of a parabolic mirror, an elliptic mirror, and an aspherical mirror.

16. The recording head of claim 11, wherein the subwavelength focusing mirror is etched through a top cladding, bottom cladding, and core of the waveguide.

17. The recording head of claim 11, wherein the near-field transducer comprises an enlarged portion and a peg, the peg being made of a different material than the enlarged portion.

18. A method comprising:
   directing light into a waveguide core of a recording head;
   coupling the light to a near-field transducer at an output end of the waveguide core near a media-facing surface of the recording head; and
   recycling a residual transverse electric field component for excitation of the near-field transducer via a sub-wavelength mirror at the output end of the waveguide, the sub-micron mirror overlapping less than a length of the near-field transducer in a direction normal to the media-facing surface.

19. The method of claim 18, wherein recycling the residual transverse electric field component comprises converting the residual transverse electric field to a longitudinal electrical field.

20. The method of claim 18, further comprising applying a magnetic field to recording medium via the recording head, the near-field transducer producing a hotspot on the recording medium while the magnetic field is applied.

* * * * *